United States Patent [19]

Peters

[11] Patent Number: 4,611,048

[45] Date of Patent: Sep. 9, 1986

[54] HYDROXY TERMINATED POLYETHERIMIDE OLIGOMERS

[75] Inventor: Edward N. Peters, Lenox, Mass.

[73] Assignee: General Electric Company, Pittsfield, Mass.

[21] Appl. No.: 784,362

[22] Filed: Oct. 4, 1985

[51] Int. Cl.[4] .............................................. C08G 73/10
[52] U.S. Cl. ...................... 528/185; 528/26; 528/125; 528/126; 528/128; 528/172
[58] Field of Search ................. 528/185, 26, 125, 126, 528/128, 172

[56] References Cited

U.S. PATENT DOCUMENTS 3,905,942  9/1975  Takekoshi et al. ................. 528/185
3,983,093  9/1976  Williams, III et al. ............. 528/185

Primary Examiner—Lester L. Lee
Attorney, Agent, or Firm—Hedman, Gibson, Costigan & Hoare

[57] ABSTRACT

Polyetherimide oligomers are end functionalized with aryl hydroxy groups by reacting mixtures of bisphenol-A dianhydride, arylene diamines and aryl aminoalcohols. The oligomers are reactive with other polymer precursors, such as bisphenol-A and phosgene to provide segmented block copolymers of improved toughness and compatibility with other resins.

15 Claims, No Drawings

HYDROXY TERMINATED POLYETHERIMIDE OLIGOMERS

The present invention relates to new polyetherimide oligomers and a process for their preparation. More particularly it relates to polyetherimide oligomers which are end functionalized with aryl hydroxyl groups, which are useful in preparing block copolymers.

BACKGROUND OF THE INVENTION

Block copolymers of polycarbonates including segments of other polymers have been known, see for example, Goldberg, U.S. Pat No. 3,030,335, Adelmann, et al., U.S. Pat. No. 4,252,922, and Behnke et al., U.S. Pat. No. 4,436,839 who disclose block copolymers of bisphenol-A carbonates including segments derived from polyalkylene glycols. In Schreckenberg et al, U.S. Pat. No. 4,217,437, the polyalkylene glycols are advantageously end-functionalized, e.g., with diphenol carbonates. Such block copolymers are useful per se as film frames and shaped articles because of toughness conferred on the polycarbonates by the segments of other polymers. The block copolymers can also be blended with polycarbonate resin, and a whole host of other thermoplastic addition and condensation polymers to provide thermoplastic molding compositions showing markedly improved resilience properties compared with the unblended resins.

It is also known that a highly useful family of heat resistant thermoplastic polymers is comprised of polyetherimide resins made by reacting a bis ether anhydride and an aromatic diamine. See, for example, Williams III, et al, U.S. Pat. No. 3,983,093, who discloses the reaction product of 2,2-bis[4-2,3-dicarboxyphenoxy phenyl] propane dianhydrid (BPA-DA) and metaphenylene diamine. The linear polymer is terminated with amino groups, and has a very high molecular weight and high glass transition temperature (Tg, typically=216° C.). Such a material cannot be readily blended with aromatic polycarbonate, because mixtures with two Tg's are obtained, one for the polyetherimide resin, and one for the polycarbonate. Furthermore because of the amino terminal groups, polyetherimides cannot be successfully used as blocks in copolymers with aromatic polycarbonate segments, as is done with polyethers. Moreover, no method is known in the art to functionalize high molecular weight polyetherimide resins to accommodate their introduction as blocks into resin copolymers, and even if there were such methods, the length of the segments would probably be too high to provide a composition that would thermoform readily in conventional equipment.

It has now been found that an entirely new approach will solve the above-mentioned problems, and this is the subject matter of the present invention. If polyetherimides are prepared from conventional ingredients in the presence of significant amounts of arylaminoalcohols there will be surprisingly obtained polyetherimide oligomers which are end functionalized with hydroxyl groups. In contrast to known polyether imides, such materials will have low intrinsic viscosities, low to moderate molecular weights and high hydroxyl equivalent weights. Moreover, they have been surprisingly found to be uniquely suitable for preparing block copolymers. For example, as is disclosed in the concurrently filed application of E. N. Peters, Ser. No. 784,511, the copolymers prepared by reacting the hydroxy-terminated polyether imide oligomers of the present application with bisphenol-A and a carbonate precursor exhibit only one glass transition temperature Tg, and have a high intrinsic viscosity, making them useful as engineering thermoplastics and in blends with other resins.

SUMMARY OF THE INVENTION

According to the present invention there are provided hydroxy-terminated polyetherimide oligomers of the formula:

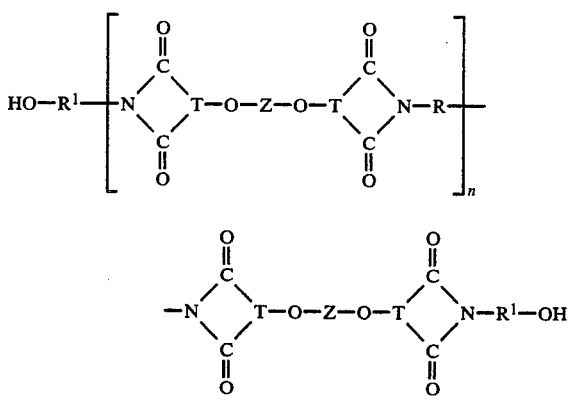

wherein n is an integer of from about 3 to about 12; and —O—T group is selected from the class consisting of:

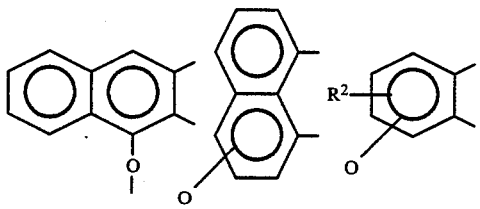

$R^2$ being hydrogen, lower alkyl or lower alkoxy; and Z is a member of the class consisting of:

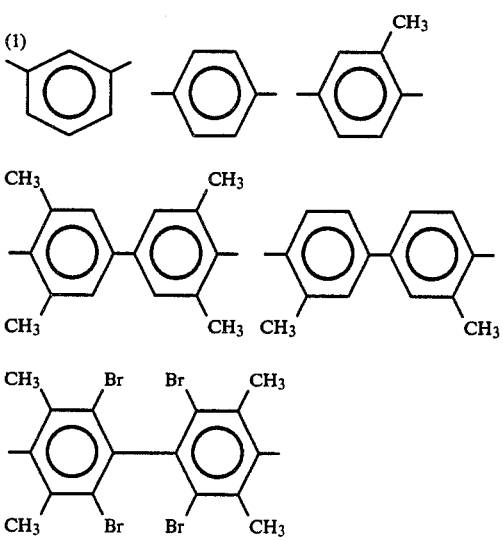

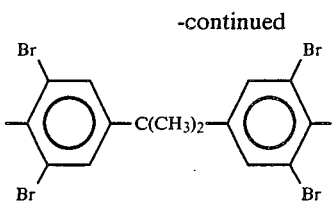

and (2) divalent organic radicals of the general formula:

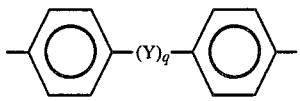

where Y is a member selected from the class consisting of divalent radicals of the formulae:

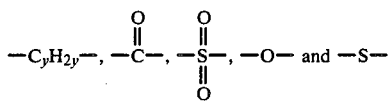

where q is 0 or 1, and y is a whole number from 1 to 5; and R is a divalent organic radical selected from the class consisting of (1) aromatic hydrocarbon radicals having from 6–20 carbon atoms and halogenated derivatives thereof (2) alkylene radicals and cycloalkylene radicals having from 2–20 carbon atoms, $C_{(2-8)}$ alkylene terminated polydiorganosiloxane, and (3) divalent radicals included by the formula:

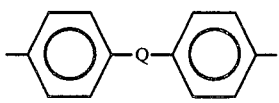

where Q is a member selected from the class consisting of:

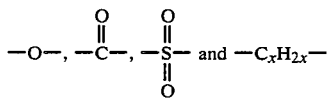

where x is a whole number from 1 to 5 inclusive; and $R^1$ is as defined for R above.

In preferred features, the polyetherimide oligomer will be of the formula

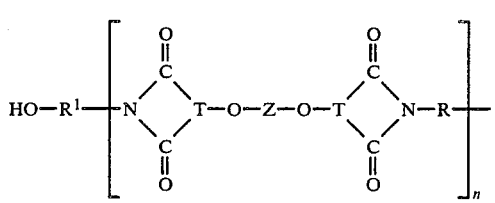

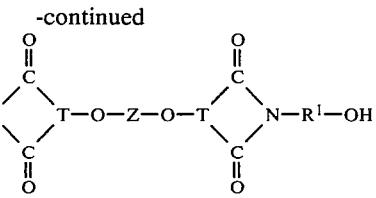

and especially those in which the divalent bonds of the —O—Z—O— radical are in the 3,3'; 3,4'; 4,3'or the 4,4'position. Also prepared are oligomers as above defined wherein Z is

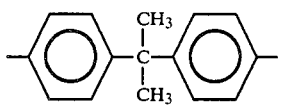

a preferred oligomer will be as above defined in the first formula wherein R and $R^1$ are independently selected from:

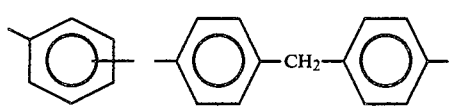

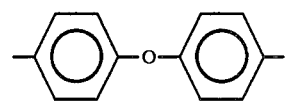

Special mention is made of oligomers wherein R is

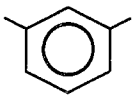

and $R^1$ is

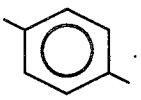

In most cases, n should be from about 5 to about 8, especially 6.5 to 7.5.

Also comtemplated by the present invention is a process to prepare the new oligomers of the above formula, said process comprising reacting a bis ether anhydride of the formula:

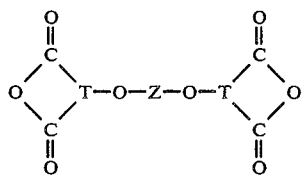

wherein T and Z are as defined above, with a diamine of the formula:

$H_2N—R—NH_2$ wherein R is as defined above, and an aminoalcohol of the formula:

$$H_2N-R^1OH$$

wherein $R^1$ is as defined above; the mole ratio of said bis ether anhydride to said diamine to said aminoalcohol being in the range of from about 0.4–0.5:0.2–0.423:0-.4–0.077.

In preferred features of this aspect, the mole ratio of said bis ether anhydride to said diamine to said aminoalcohol is 1+b:b:2 where b is an integer of about 2 to about 12.

DETAILED DESCRIPTION OF THE INVENTION

The bis ether anhydrides used to prepare the polyetherimides of this invention are known or can be readily prepared by those skilled in this art. See, for example, Heath, et al, U.S. Pat. No. 3,847,867. In general, the disodium salt of a dihydric phenol is reacted with a haloarylimide or a nitroarylimide under condition wherein the C—O—C bonds are formed to give a bis imide which are converted to bis anhydrides.

Aromatic bis(ether anhydride)s include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2, 3-dicarboxyphenoxy)diphenyl sulfide dianhydride; 1,4-bis(2,3-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride 2,2-bis[4-(3,4-dicarboxyphenoxy) phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 1,3-bis(3,4-dicarboxyphenoxy) benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4,(3,4-dicarboxyphenoxy)diphenyl -2,2-propane dianhydride; etc. and mixtures of such dianhydrides.

Suitable organic diamines include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphyenyl ether, 1,5-diaminonaphthalene, 3,3'-dimethlybenzidine,3,3'-dimethoxybenzidine, 2,4-bis(beta-amino-tbutyl)toluene, bis(p-beta-amino-t-butylphenyl)-ether, bis(p-beta-methyl-oaminopentyl)benzene, 1,3-diamino- 4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-amino-propyl)sulfide, N-methyl-bis(3-aminopropyl)amine, hexamethylenediame, heptamethylenediamine, nonamethylenediamine, decamethylenediamine, bis(3-amino-propyl)tetramethyldisiloxane, bis(4-aminobutyl)tetramethyldisiloxane, etc.

Suitable aromatic aminoalcohols can vary widely in type. In general, these can be used
p-aminophenol
m-aminophenol
4-hydroxy-4'-aminodiphenylpropane
4-hydroxy-4'-aminodiphenyl methane
aminohydroxydiphenylsulfone,
4-hydroxy-4'≃aminodiphenyl ether,
2-hydroxy-4-aminotoluene, and
illustratively any analogs of those given for the diamines above.

In general, the reactions can be advantageously carried out employing well-known solvents, e.g., o-dichlorobenzene, m-cresol/toluene, etc. in which to effect interaction between the dianhydrides and the diamines, at temperatures of from about 60° to about 250° C. Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and aminoalcohol mixture and dianhydride are employed for the polyetherimide oligomers. In preferred features of this aspect, the mole ratio of said bis ether anhydride to said diamine to said aminoalcohol is 1+b:b: 2 where b is an integer of about 2 to about 12. The mole ratio of diamine to aminoalcohol can vary, but usually is in the range of 33–83 mole % of diamine to 67–17% aminoalcohol. Preferred mole ratios are 0.4–0.5 bisether anhydride to 0.2–0.423 diamine to 0.4–0.077 aminoalcohol. Generally, useful hydroxy-terminated polyetherimide oligomers have an intrinsic viscosity greater than 0.05 deciliters per gram, preferably 0.15 to 0.30, deciliters per gram when measured in chloroform at 25° C.

In one manner of providing the bisphenol A dianhydride, aromatic diamine and aromatic aminoalcohol are reacted in a solvent at 60° C. and then at 180° C. for 1 to 4 hours. Then the reaction mixture is cooled whereupon the product is isolated by adding to a nonsolvent.

In a typical use, the polyetherimide oligomers are subjected to standard interfacial phosgenation in admixture with bisphenol A to produce a copolymer having polyetherimide blocks and aromatic polycarbonate blocks exhibiting a single Tg.

DESCRIPTION OF THE PREFERRED EMBODIMENTS

The following examples illustrate the present invention, but are not intended to limit it in any manner whatsoever.

EXAMPLE 1

In a five liter, 3-necked flask equipped with mechanical stirrer, thermometer, nitrogen inlet and Dean-Stark trap/condenser was charged with 2 liters of o-dichlorobenzene, 1145.03 grams (2.20 moles) bis(4-(3,4-dicarboxy-phenoxy) phenyl) propane dianhydride, and 0.2 grams sodium benzophosphonate. Under nitrogen the mixture was stirred and heated to 60° C. After 30 minutes 216.28 grams (2.00 moles) m-phenlene diamine was added. After stirring for 30 minutes 43.65 grams (0.40 moles) p-aminophenol was added and the temperature was slowly raised to 180° C. with azeotropic removal of water. After two hours at 180° C. the mixture was cooled. The oligomer was isolated by precipitation in methanol. The resultant powder was dried at 125° C. under vacuum. This material exhibited an intrinsic viscosity of 0.18 dl./g. as measured in chloroform and a number average molecular weight of 3660 by gel permeation chromatography, a compound of the formula

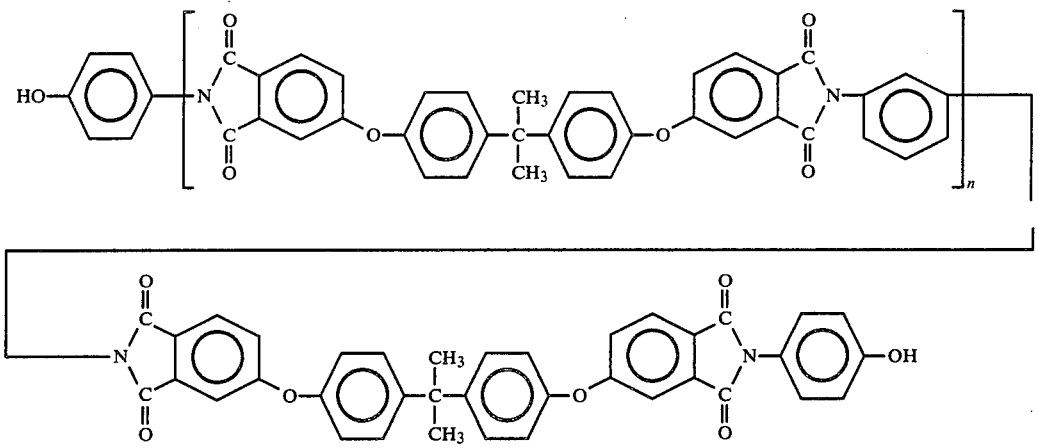

EXAMPLE 2

If the procedure of Example 1 is repeated and if 4,4-diaminodiphenylmethane is substituted for the diamine, a polymer with an intrinsic viscosity of 0.16 dl/g (in chloroform) is obtained.

EXAMPLE 3

If the procedure of Example 1 is repeated and if 4,4-diamino-diphenylether is substituted for the diamine, a polymer with an intrinsic viscosity of 0.18 dl/g (in chloroform) is obtained.

EXAMPLE 4

If the procedure of Example 1 is repeated and if 4-amino-4'-hydroxydiphenyl propane is substituted for the p-aminophenol, a polymer with an intrinsic viscosity of 0.19 dl/g (chloroform) is obtained.

EXAMPLE 5

If the procedure of Example 1 is repeated and if m-aminophenol is substituted for the p-aminophenol, a polymer with an intrinsic viscosity of 0.15 dl/g (chloroform) is obtained.

EXAMPLE 6

If the procedure of Example 1 is repeated and if the following bis ether anhydrides are substituted:
bis[3-(3,4-dicarboxyphenoxy) phenyl]propane dianhydride;
3-(3,4-dicarboxyphenoxyphenyl-4'-(3,4-dicarboxyphenoxyphenyl)-1,3-propane dianhydride;
and 4-(3,4-dicarboxyphenoxyphenyl)-3'-(3,4-dicarboxyphenoxyphenyl) 1,3-propane carbonate,
and if p-phenylenediamine, 4,4'-diaminodiphenylmethane, and 4,4'-diamino-diphenylether are substituted for m-phenylenediamine, and m-aminophenol, 4-amino-4'-hydroxydiphenylmethane and 4-amino-4'-hydroxydiphenyl ether are substituted for p-aminophenol, the corresponding hydroxy-terminated polyetherimide oligomers of this invention will be obtained.

The foregoing patents, applications and publications are incorporated herein by reference.

Many variations in the instant invention will suggest themselves to those skilled in this art in light of the foregoing detailed description. All such obvious variations are within the full intended scope of the invention as defined by the appended claims.

What is claimed is:
1. A hydroxy terminated polyetherimide oligomer of the formula:

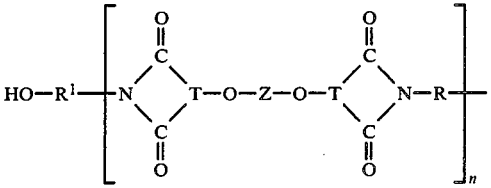

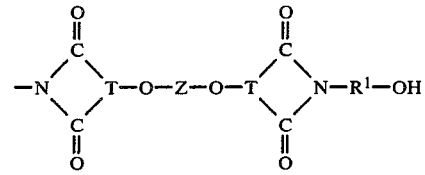

wherein n is an integer of from about 1 to about 12; and —O—T< group is selected from the class consisting of:

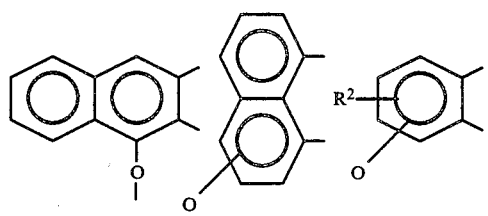

$R^2$ being hydrogen, lower alkyl or lower alkoxy; and Z is a member of the class consisting of:

(1) 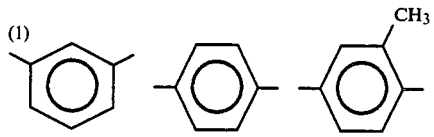

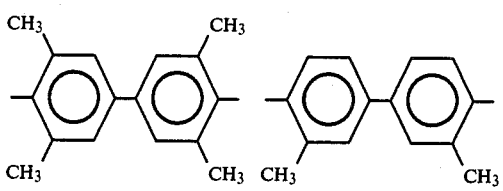

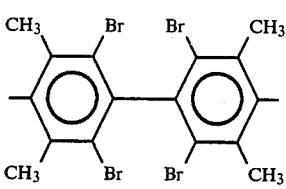

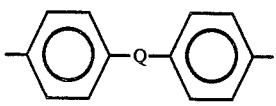

and (2) divalent organic radicals of the general formula:

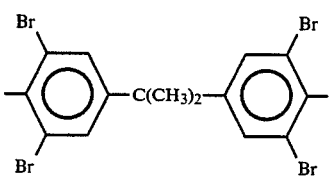

where Y is a member selected from the class consisting of divalent radicals of the formulae:

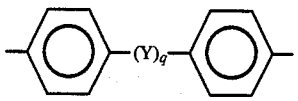

where q is 0 or 1, and y is a whole number from 1 to 5; and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganoloxane, and (3) divalent radicals included by the formula:

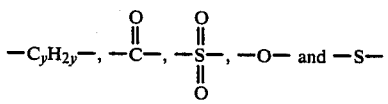

where Q is a member selected from the class consisting of:

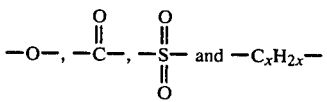

where x is a whole number from 1 to 5 inclusive; and $R^1$ is as defined for R above.

2. An oligomer as defined in claim 1 of the formula:

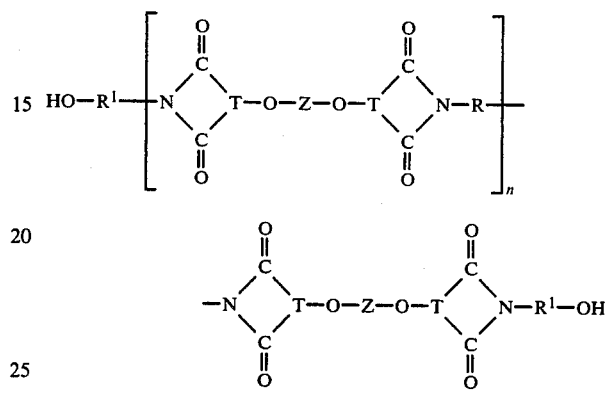

wherein n is from about 4 to about 10.

3. An oligomer as defined in claim 1 wherein the divalent bonds of the —O—Z—O— radical are in the 3,3'; 3,4'; 4,3' or the 4,4' position.

4. An oligomer as defined in claim 1 wherein Z is

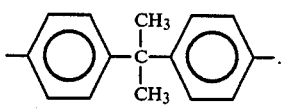

5. An oligomer as defined in claim 1 wherein R and $R^1$ are independently selected from:

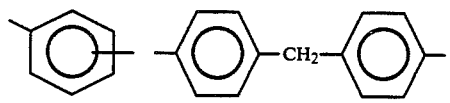

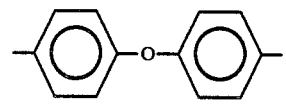

6. An oligomer as defined in claim 4 wherein R is

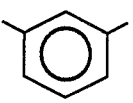

and $R^1$ is

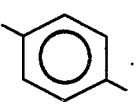

7. An oligomer as defined in claim 1 wherein n is from about 5 to about 8.

8. A process for the preparation of a hydroxy terminated polyetherimide oligomer of the formula:

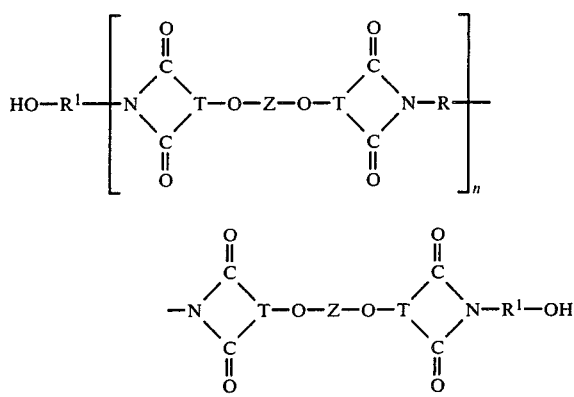

wherein n is an integer of from about 3 to about 12; and —O—T< group is selected from the class consisting of:

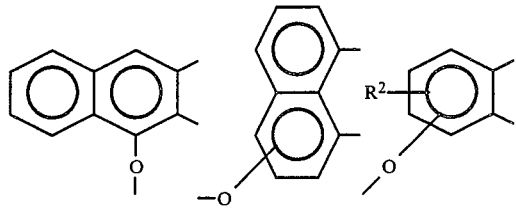

$R^2$ being hydrogen, lower alkyl or lower alkoxy; and Z is a member of the class consisting of:

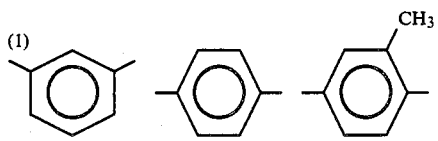

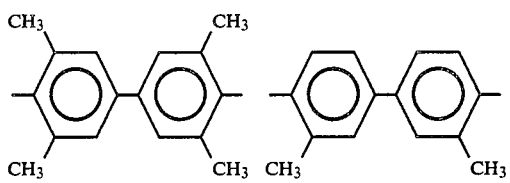

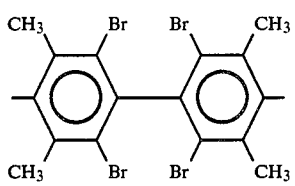

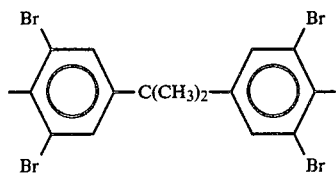

and (2) divalent organic radicals of the general formula:

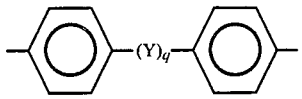

where Y is a member selected from the class consisting of divalent radicals of the formulas:

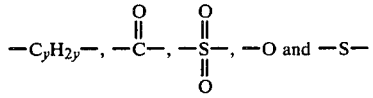

where q is 0 or 1, and y is a whole number from 1 to 5; and R is a divalent organic radical selected from the class consisting of (1) aromatic hydrocarbon radicals having from 6-20 carbon atoms and halogenated derivatives thereof, (2) alkylene radicals and cycloalkylene radicals having from 20-20 carbon atoms, $C_{(2-8)}$ alkylene terminated polydiorganosiloxane, and (3) divalent radicals included by the formula:

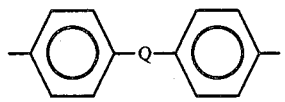

where Q is a member selected from the class consisting of:

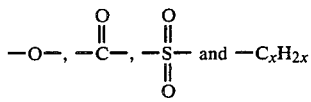

where x is a whole number from 1 to 5 inclusive; and $R^1$ is as defined for R above; said process comprising reacting a bis ether anhydride of the formula:

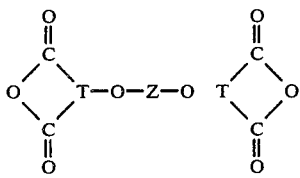

wherein T and Z are as defined above, with the diamine of the formula:

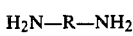

H₂N—R—NH₂ wherein R is as defined above, and an aminoalcohol of the formula:

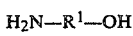

H₂N—R¹—OH wherein $R^1$ is as defined above, by admixing said bis ether anhydride, diamine and aminoalcohol in a solvent and heating at a temperature of about 60° to about 250° C.; the mole ratio of said bis ether anhydride to said diamine to said aminoalcohol being in the range of from about 0.4–0.5:0.2–0.423:0.4–0.077.

9. A process as defined in claim 8 wherein the product is of the formula:

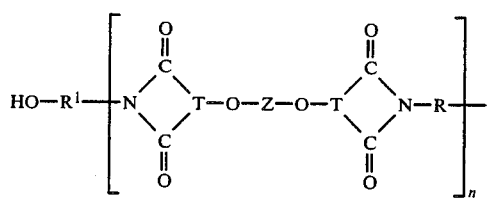

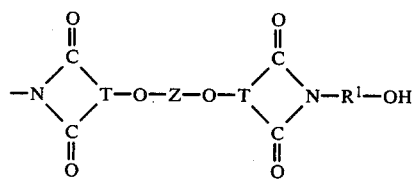

wherein n is from about 4 to about 10.

10. A process as defined in claim 8 wherein the divalent bonds of the —O—Z—O radical are in the 3,3¹; 3,4¹; 4,3¹ or the 4,4¹ position.

11. A process as defined in claim 8 wherein Z is:

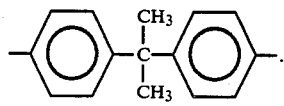

12. A process as defined in claim 8 wherein R and R¹ are independently selected from:

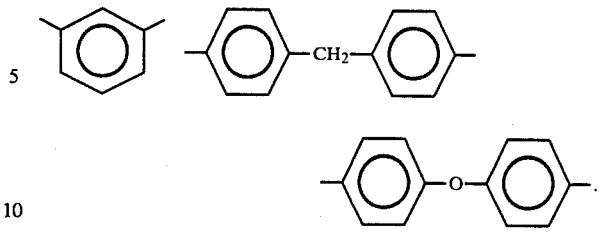

13. A proess as defined in claim 8 wherein R is

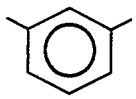

and R¹ is

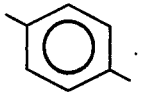

14. A process as defined in claim 8 wherein n is from about 5 to about 8.

15. A process as defined in claim 8 wherein the mole ratio of said bis ether anhydride to said diamine to said aminoalcohol is 1+b:b:2 where b is an integer of about 2 to about 12.

* * * * *